United States Patent Office 3,830,846
Patented Aug. 20, 1974

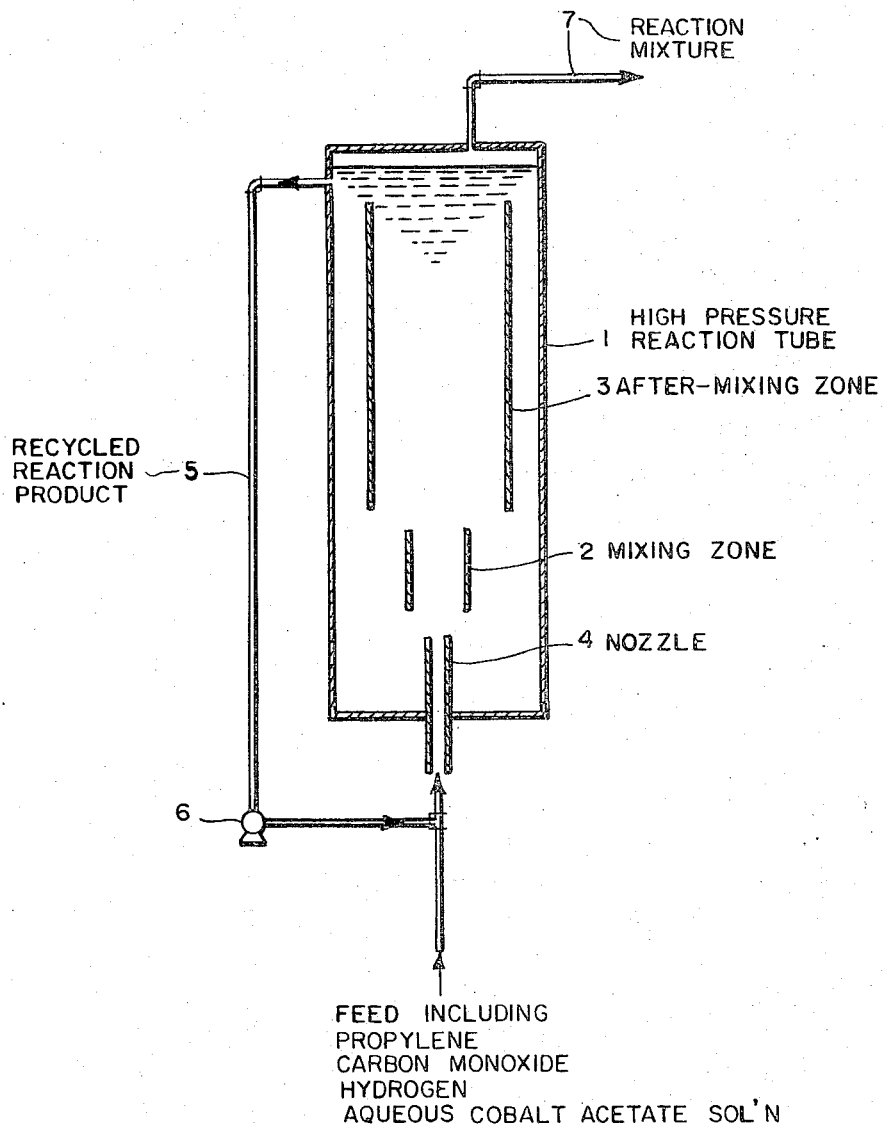

3,830,846
PRODUCTION OF ALDEHYDES AND ALCOHOLS BY THE OXO PROCESS
Gerd Duembgen, Dannstadt, and Guenther Heesemann, Heinz Hohenschutz, and Horst Kerber, Mannheim, Otto Nagel, Hambach, Robert Rothe, Ludwigshafen, and Helmut Walz, Frankenthal, Germany, assignors to Badische Anilin- & Soda-Fabric Aktiengesellschaft, Ludwigshafen (Rhine), Germany
Filed July 22, 1970, Ser. No. 57,190
Claims priority, application Germany, July 26, 1969, P 19 38 102.3
Int. Cl. C07c 27/24, 47/00
U.S. Cl. 260—598
3 Claims

ABSTRACT OF THE DISCLOSURE

An improved process for the production of aldehydes and alcohols by the oxo process by reaction of olefinically unsaturated compounds with carbon monoxide and hydrogen in the presence of cobalt carbonyl compounds at elevated temperature and superatmospheric pressure in which the reactants are introduced into the reaction zone at high speed. The improvement consists in introducing the reactants into a mixing zone extending in the direction of entry of the reactants, the mixing zone having a diameter which is twice to fifty times the mean diameter of the stream of reactants supplied and the length of the mixing zone being from three to thirty times its hydraulic diameter.

This invention relates to an improved process for the production of aldehydes and alcohols by the oxo process by reaction of olefinically unsaturated compounds with carbon monoxide and hydrogen in the presence of cobalt carbonyl compounds in which the reactants are introduced at high speed in a stream into the reaction zone.

The reaction of olefins with carbon monoxide and hydrogen to form aldehydes and alcohols by the oxo method proceeds exothermally. In carrying out the process continuously on a commercial scale it is therefore necessary to distribute the heat of reaction in the reaction mixture and to avoid local temperature peaks which result in undesired side reactions and secondary reactions. Moreover it is necessary to ensure that the starting materials which are liquid on the one hand and gaseous on the other hand are mixed well so that the reaction proceeds in the stoichiometric ratio. It is already known that the reaction may be carried out in great dilution. Circulation equipment has been used and the initial olefin, carbon monoxide and hydrogen and also as a rule the catalyst are introduced into already formed reaction product in which the said substances are distributed and are then present in low concentration. For example in German Printed Application No. 1,135,879 a reactor is described which contains a free standing circulation tube in the interior which permits a circulating convection flow. In the method of German Printed Application No. 1,085,144 circulation of the liquid reaction product is achieved, not by heat convection, but by high gas velocities, i.e. according to the airlift principle. According to the Example in the said German Printed Application, the temperature in the reactor is constant within 2° C. Since the large amount of gas which is necessary for the production of the liquid circulation cannot be withdrawn simply as offgas, the excess gas has to be recycled. Expensive recycle pumps are required for this purpose. Moreover the reaction chamber is not utilized well because a considerable portion of it is filled by gas bubbles. Moreover there is a risk that stoppages may occur by deposition of cobalt due to decomposition of entrained cobalt carbonyl.

This disadvantage is less pronounced in the process according to German Printed Application No. 1,003,708 in which only such an amount of synthesis gas is used as will dissolve in the reaction mixture and circulation of the liquid is effected by a liquid pump provided in the loop. Recirculation of large amounts of reaction product is however expensive in terms of both energy consumption and equipment. Finally it is known from German Printed Application No. 1,205,514 that circulation of liquid within the reaction zone can be achieved by utilizing the energy introduced by the liquid reactants. The method has the disadvantage that fairly large fluctuations in the reaction temperature occur within the reaction zone. Moreover it is not possible to use relatively dilute aqueous solutions of cobalt salts as starting materials for the catalysts.

All prior art methods have the disadvantage that when using commercial size equipment it is not possible to use more than 0.3 kg. of olefin per liter of reaction space per hour with the assumption of a conversion of at least 95% to the desired reaction products (cf. Stanford Research Report, No. 21, November 1966). As soon as an attempt is made to achieve higher space velocities it is no longer possible to mix the starting materials supplied, particularly the gaseous starting materials, rapidly enough with each other and with the contents of the reaction zone. The result is that unreacted starting material is carried out from the reaction zone in large amounts. This makes necessary not only expensive recirculation of unused starting material but decreases the conversion per unit of olefin introduced.

The object of this invention is to provide a process in which high space velocities (amounts of olefins per liter of reaction space per hour) are achieved. Another object of the invention is to provide a process in which the starting materials are mixed well. Yet another object of the invention is to provide a process in which the formation of high boiling residues is minimized.

In accordance with this invention, these objects and advantages are achieved in an improved process for the production of aldehydes and alcohols by the oxo process comprising the reaction of olefinically unsaturated compounds with carbon monoxide and hydrogen in the presence of cobalt carbonyl compounds at elevated temperature and at superatmospheric pressure, the reactants being introduced into the reaction zone at high speed wherein the improvement consists in introducing the reactants into a mixing zone provided within the reaction zone and extending in the direction in which the reactants enter, the mixing zone having from twice to fifty times the mean diameter of the stream of reactants supplied and having a length which is from three to thirty times its hydraulic diameter.

It is preferred to use aliphatic, cycloaliphatic or aralphatic olefinically unsaturated compounds having up to twenty carbon atoms, particularly having up to sixteen carbon atoms. The preferred olefinically unsaturated compounds may have more then one double bond, for example two non-conjugated double bonds, or substitutents which are inert under the reaction conditions such as alkoxy groups having one to four carbon atoms, carboxyl groups or carbalkoxy groups having two to nine carbon atoms. Olefinically unsaturated compounds having the said numbers of carbon atoms and hydrocarbon structure are particularly preferred. Olefins having two to twenty, particularly with two to sixteen, carbon atoms and especially those having terminal double bonds have particular industrial importance. Examples of suitable olefinically unsaturated compounds are: ethylene, propylene, hexene-(1), octene-(1), decene-(1), cyclohexene, styrene, allyl alcohol, allyl methyl ether, methyl crotonate, mixtures of olefins such as are obtained in the oligomerization of propene and butene, for example trimeric propylene or the compound known as codibutylene.

Carbon monoxide and hydrogen are generally used in a ratio by volume of 1:0.8 to 1:3, particularly 1:0.8 to 1:2. The said gas mixture is advantageously used in excess.

The reaction is advantageously carried out at temperatures of from 120° to 220° C. particularly from 140° to 200° C. Good results are obtained when the reaction is carried out at pressures of from 60 to 350 atmospheres. Pressures of 80 to 320 atmospheres have proved to be particularly favorable industrially.

It is advantageous to carry out the reaction in the presence of solvents such as hydrocarbons, for example cyclohexane or xylene, alcohols such as butanol, or aldehydes such as butyraldehyde. Industrially it is advantageous to use as the solvent the substance obtained as reaction product.

The reaction is carried out in the presence of cobalt carbonyl compounds. It is advantageous to use the cobalt carbonyl compounds in amounts of from 0.5 to 5% by weight, reckoned as cobalt and with reference to the olefinically unsaturated compound. Particularly good results are obtained by using 1 to 3% by weight of cobalt. It is possible to prepare the catalysts prior to the reaction or in situ during the reaction from the individual constituents, for example fatty acid salts, particularly salts with lower fatty acids of cobalt. It is advantageous to use aqueous solutions of cobalt salts which have a content of 0.1 to 3% by weight, particularly 0.5 to 2% by weight, of cobalt calculated as metal. It is furthermore also possible to add modifying agents for the cobalt carbonyl compounds, such as tertiary phosphines.

The reactants (i.e. the starting olefins, the gaseous starting materials and the catalyst solution with or without recycled reaction product which is regarded as a reactant in the context of this invention) are introduced at high speed, advantageously at 10 to 100, particularly at 10 to 60, meters per second through a nozzle into the reaction zone. The invention includes the introduction of only some, for example 80 to 90%, of the reactants in the said manner into the reaction zone. The reactants thus introduced are supplied to a mixing zone situated in the reaction zone and extending in the direction of entry of the reactants. The mixing zone has a mean diameter which is twice to fifty times, preferably twice to ten times, the mean diameter of the inflowing stream of reactants. The mean diameter of the stream is the diameter of a circle having the same area as the cross-section of a round nozzle or other inlet opening, for example a slot or annular nozzle. The mixing zone may have a cross-section which is constant or which varies in the direction of flow. The mixing zone may assume various shapes, the shape advantageously being adapted to the shape of nozzle used. Cylindrical tubes or conic segments are generally used. When the mixing zone is a cylindrical tube, its length should be from three to thirty times its diameter. When the mixing zone does not have a circular cross-section or a cross-section which is constant over its length, its length should be from three to thirty times its hydraulic diameter. The hydraulic diameter is the diameter of a cylindrical tube which exhibits the same pressure drop as the mixing zone in question having the same length and the same throughput. Instead of a single nozzle for the starting material supplied and a mixing zone appropriate therefor, a bundle of nozzles and a bundle of appropriate mixing zones may be used and it is advantageous to use nozzles having the same size. It is also possible to combine more than one nozzle with one mixing zone.

It is advantageous to provide beyond the mixing zone, as a cascade, one or more (for example one or two) aftermixing zones. In the simplest case the aftermixing zone may be a cylindrical tube having a diameter which is 1.1 to 10 times, preferably 1.3 to 3 times, larger than the diameter of the preceding mixing zone, and any further aftermixing zones may each have a diameter which is 1.1 to 10 times larger than the diameter of the preceding zone.

It has also proved to be advantageous to cool the reaction zone with boiling organic substances, for example lower alkanols or mixtures of the same with water, particularly methanol or a mixture thereof with water, as coolant. The boiling point of the mixture is influenced by the use of pressure so that a boiling point of from 50° to 180° C., particularly of from 70° to 110° C., is achieved. The cooling zone is fed with such an amount of the said cooling liquid that its heat exchange surfaces are always wetted with liquid. It is advantageous to choose the boiling point so that a difference in temperature of from 20° to 100° C. is maintained between the boiling point and the temperature of the reaction zone.

The process according to the invention may be carried out for example, as illustrated in the drawing, by supplying the olefinically unsaturated compound, carbon monoxide and hydrogen and the catalyst solution at the said speeds through a nozzle 4 to a vertical high pressure tube 1 which is provided with a mixing zone 2 having the said dimensions and an aftermixing zone 3. On an industrial scale the reaction is usually carried out in reaction zones of 0.2 to 100 cubic meters, particularly 5 to 60 cubic meters, advantageously while maintaining a ratio of length:diameter in the reaction zone of from 1:1 to 20:1. The reaction is carried out under the specified pressure and temperature conditions. In order to vary the speed of the inflowing stream of reactants it is advantageous to pass some of the contents of the reactor through a loop 5 and pump 6 back into the reaction chamber through the nozzle 4. The reaction mixture is withdrawn through line 7 from the high pressure tube. The reaction mixture is then freed from catalyst by known methods and separated into its individual constituents.

The aldehydes and alcohols prepared by the process according to the invention are suitable for the production of solvents and plasticizers.

The following Example illustrates the invention.

EXAMPLE

Into a vertical high pressure tube having a capacity of 11.6 cubic meters, a length of 18 meters and a diameter of 1 meter in which 60 cm. above the bottom a mixing zone having a diameter of 16 cm. and a length of 110 cm. and, above this, an aftermixing zone having a diameter of 27 cm. and a length of 134 cm. are provided, 6900 kg. of propylene, 9400 cubic meters (STP) of carbon monoxide and hydrogen in the ratio 1:1.180 and 1300 liters of aqueous cobalt acetate solution having a cobalt content of 1% by weight are supplied per hour from below through a multi-fluid nozzle at a speed of 60 meters per second and 100 cubic meters of recycled reaction product is supplied per hour at a speed of 25 meters per second. Prior to metering in the starting materials, the high pressure tube is filled with the expected reaction product. The cooling system is charged with methanol, an entry temperature of 80° C. and an outlet temperature of 108° C. being maintained. The pressure in the cooling system is 2.1 atmospheres gauge. A pressure of 290 atmospheres and a temperature of 152° C.±3° C. are maintained in the high pressure tube. The product is 11,700 kg. per hour of crude reaction mixture which contains 68% by weight of n-butyraldehyde, 17% by weight of isobutyraldehyde, 7% by weight of n-butanol, 4% by weight of isobutanol and 4% by weight of higher boiling constituents. The fraction of linear compounds is 78%.

We claim:

1. In a process for the continuous production of aldehydes and alcohols by the oxo process by reaction in an elongated reaction zone of an olefinic hydrocarbon of 2 up to twenty carbon atoms with carbon monoxide and hydrogen in admixture with at least one cobalt carbonyl compound as the essential carbonylation catalyst at temperatures of from 120° to 220° C. and pressures of 20 to 400 atmospheres, the improvement which comprises introducing the reactants including recycled reaction product through a nozzle into the reaction zone as a supply stream at a speed of from 10 to 100 meters per second, directing the reactants by said nozzle into a first mixing zone which extends in the direction of entry of the reactants, which is located completely within said elongated reaction zone and which has a diameter which is twice to fifty times the mean diameter of said supply stream of reactants, the length of said first mixing zone being from three to thirty times its diameter, and further directing the reactants into one or two aftermixing zones having a diameter which is from 1.1 to 10 times greater than that of the next preceding mixture zone, said one or two aftermixing zones being provided directly downstream of said first mixing zone and also located completely within said reaction zone.

2. A process as claimed in claim 1 wherein the reactants are introduced into the reaction zone at a speed of from 10 to 60 meters per second.

3. A process as claimed in claim 1 wherein the first mixing zone has from twice to ten times the mean diameter of the stream of reactants supplied.

References Cited

UNITED STATES PATENTS

| | | | |
|---|---|---|---|
| 3,337,603 | 8/1967 | Kato et al. | 260—604 HF |
| 2,662,911 | 12/1953 | Dorschner et al. | 260—449.5 |
| 2,557,701 | 6/1951 | Smith | 260—604 HF |

FOREIGN PATENTS

| | | | |
|---|---|---|---|
| 1,416,828 | 9/1965 | France | 260—604 HF |
| 786,809 | 11/1957 | Great Britain | 260—604 HF |

JOSEPH E. EVANS, Primary Examiner

U.S. Cl. X.R.

23—285, 288 E; 260—476, 535 R, 599, 602, 604 HF